US012643288B2

(12) United States Patent
Shinozaki

(10) Patent No.: US 12,643,288 B2
(45) Date of Patent: Jun. 2, 2026

(54) AM APPARATUS

(71) Applicant: EBARA CORPORATION, Tokyo (JP)

(72) Inventor: Hiroyuki Shinozaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 637 days.

(21) Appl. No.: 17/618,133

(22) PCT Filed: Jun. 5, 2020

(86) PCT No.: PCT/JP2020/022216
§ 371 (c)(1),
(2) Date: Dec. 10, 2021

(87) PCT Pub. No.: WO2021/002143
PCT Pub. Date: Jan. 7, 2021

(65) Prior Publication Data
US 2022/0234285 A1 Jul. 28, 2022

(30) Foreign Application Priority Data

Jul. 2, 2019 (JP) ................................. 2019-123764

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 12/41* (2021.01); *B22F 12/44* (2021.01);
(Continued)

(58) Field of Classification Search
CPC ... B29C 64/153; B29C 64/268; B29C 64/393; B29C 64/343; B29C 64/321;
(Continued)

(56) References Cited

U.S. PATENT DOCUMENTS 5,817,206 A 10/1998 McAlea et al.
2016/0008922 A1 1/2016 Schwarze
(Continued)

FOREIGN PATENT DOCUMENTS

CN 105642893 A 6/2016
EP 3 360 626 B1 9/2019
(Continued)

OTHER PUBLICATIONS

Extended European search report issued in European Patent Application No. 20834946.4 dated Jul. 3, 2023.
(Continued)

*Primary Examiner* — Galen H Hauth
*Assistant Examiner* — Baileigh Kate Darnell
(74) *Attorney, Agent, or Firm* — Chrisman Gallo Tochtrop LLC

(57) ABSTRACT

One of objects of the present application is to provide a technique for reducing a fabrication time while preventing or reducing the occurrence of fume and spatter in an AM apparatus.
According to one aspect, an AM apparatus configured to manufacture a fabricated object is provided. This AM apparatus includes a beam source configured to irradiate a material of the fabricated object with a beam, an adjustment device configured to adjust an intensity of the beam, a beam adjustment mechanism configured to adjust a beam size on the material, and a fabrication recipe determination device. The fabrication recipe determination device is configured to determine the intensity of the beam and the beam size on the material based on a property of the material of the fabricated object.

5 Claims, 4 Drawing Sheets

(51) Int. Cl.

| | |
|---|---|
| *B22F 10/36* | (2021.01) |
| *B22F 12/41* | (2021.01) |
| *B22F 12/44* | (2021.01) |
| *B29C 64/268* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC ........ *B29C 64/268* (2017.08); *B22F 2998/10* (2013.01); *B22F 2999/00* (2013.01); *B29C 64/393* (2017.08); *B33Y 10/00* (2014.12); *B33Y 30/00* (2014.12); *B33Y 50/02* (2014.12)

(58) Field of Classification Search
CPC ......... B33Y 30/00; B33Y 40/00; B33Y 50/02; B22F 10/28; B22F 10/36; B22F 10/85; B22F 10/368; B22F 12/00; B22F 12/30; B22F 12/41; B22F 12/44; B22F 12/90; B22F 10/30; B22F 10/34; B22F 10/366
See application file for complete search history.

(56) References Cited

U.S. PATENT DOCUMENTS

| | | | |
|---|---|---|---|
| 2016/0059352 | A1 | 3/2016 | Sparks |
| 2016/0318072 | A1* | 11/2016 | Martin ............... B23K 15/0086 |
| 2017/0136545 | A1 | 5/2017 | Yoshimura et al. |
| 2018/0065179 | A1* | 3/2018 | Goto ....................... B22F 12/49 |
| 2018/0311760 | A1* | 11/2018 | El Naga ................ B22F 10/362 |
| 2018/0339360 | A1 | 11/2018 | Goto |
| 2019/0047226 | A1* | 2/2019 | Ishikawa ................ B33Y 50/02 |
| 2019/0099914 | A1 | 4/2019 | Kitani et al. |
| 2019/0358737 | A1* | 11/2019 | Richardson .......... B23K 15/002 |
| 2020/0276669 | A1* | 9/2020 | Dardis .................. B22F 10/366 |
| 2021/0237158 | A1* | 8/2021 | Pavan .................... B22F 10/85 |
| 2021/0245439 | A1* | 8/2021 | Mansell ............... B29C 64/336 |
| 2021/0402479 | A1* | 12/2021 | Backlund .............. B33Y 30/00 |

FOREIGN PATENT DOCUMENTS

| | | |
|---|---|---|
| JP | S63-63293 B2 | 12/1988 |
| JP | 2000-504642 A | 4/2000 |
| JP | 2016-516888 A | 6/2016 |
| JP | 6363293 B1 | 7/2018 |
| JP | 2018-123381 A | 8/2018 |
| JP | 2019-064226 A | 4/2019 |
| WO | 2015/151839 A1 | 10/2015 |

OTHER PUBLICATIONS

International Search Report dated Aug. 25, 2020 issued in Patent Application No. PCT/JP2020/022216.

Written Opinion dated Aug. 25, 2020 issued in Patent Application No. PCT/JP2020/022216.

* cited by examiner

AM APPARATUS

TECHNICAL FIELD

The present application relates to an AM apparatus. The present application claims priority under the Paris Convention to Japanese Patent Application No. 2019-123764 filed on Jul. 2, 2019. The entire disclosure of Japanese Patent Application No. 2019-123764 including the specification, the claims, the drawings, and the abstract is incorporated herein by reference in its entirety.

BACKGROUND ART

There are known techniques for directly fabricating a three-dimensional object based on three-dimensional data on a computer that expresses the three-dimensional object. Known examples thereof include the Additive Manufacturing (AM) technique. As one example, in the AM technique using metal powder, each layer of the three-dimensional object is fabricated by, toward the metal powder deposited all over a surface, irradiating a portion thereof to be fabricated with a laser beam or an electron beam serving as a heat source, and melting and solidifying or sintering the metal powder. In the AM technique, a desired three-dimensional object can be fabricated by repeating such a process.

CITATION LIST

Patent Literature

PTL 1: International Publication No. 2015-151839
PTL 2: Japanese Patent Application Public Disclosure No. 2018-123381

SUMMARY OF INVENTION

Technical Problem

An AM apparatus using the metal powder as the material gradually forms each layer of the fabricated object by scanning the beam layer by layer, and therefore the fabrication time increases as the size of the fabricated object increases. As one of objects of the AM apparatus, a reduction in the fabrication time is desired. One conceivable measure for reducing the fabrication time is to thickly deposit the metal powder all over the surface in one layering process to fabricate a thick layer in one layering process. However, thickly depositing the metal powder all over the surface necessitates a certain time for a heat amount to move to the inside due to the thermal conductive property of the material, thereby raising a possibility that the fabrication cannot be conducted appropriately with the metal powder layer melted only on the surface thereof and the inside thereof remaining unmelted. Another conceivable measure for reducing the fabrication time is to increase the irradiation energy and the scanning speed of the beam. However, increasing the irradiation energy of the beam causes an excessive increase in the temperature of the surface of the metal powder layer to thus facilitate the occurrence of fume and spatter. The occurrence of fume and spatter may, for example, cause a defect in the fabricated object and/or cause a failure in the beam irradiation system, thereby making it impossible to maintain stable fabrication. Therefore, one of objects of the present application is to provide a technique for reducing the fabrication time while preventing or reducing the occurrence of fume and spatter in the AM apparatus.

Solution to Problem

According to one aspect, an AM apparatus configured to manufacture a fabricated object is provided. This AM apparatus includes a beam source configured to irradiate a material of the fabricated object with a beam, an adjustment device configured to adjust an intensity of the beam, a beam adjustment mechanism configured to adjust a beam size on the material, and a fabrication recipe determination device. The fabrication recipe determination device is configured to determine the intensity of the beam and the beam size on the material based on a property of the material of the fabricated object.

DESCRIPTION OF EMBODIMENTS

Figure 1:
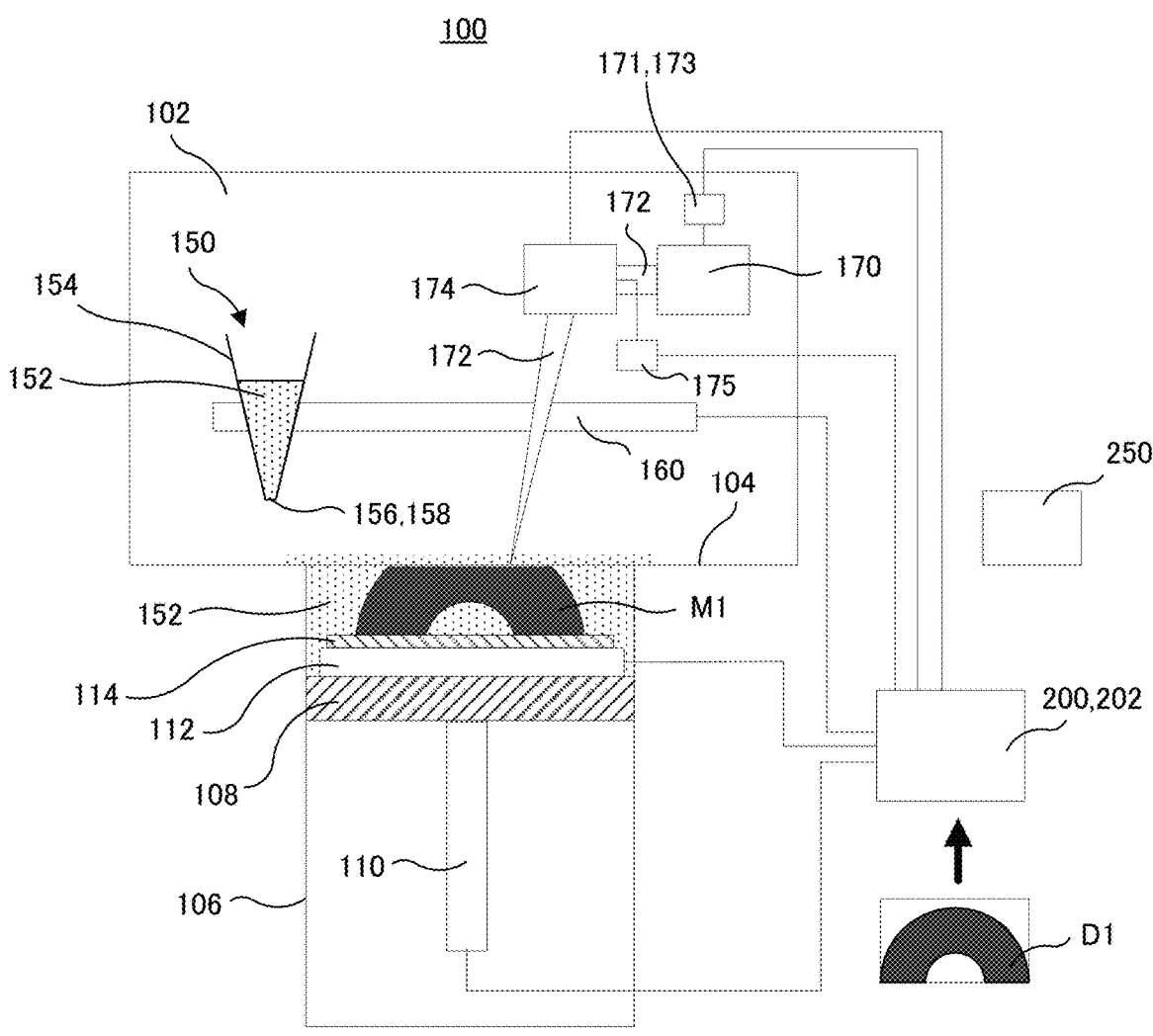
FIG. 1 schematically illustrates an AM apparatus for manufacturing a fabricated object according to one embodiment.

In the following description, embodiments of an AM apparatus for manufacturing a fabricated object according to the present invention will be described with reference to the attached drawings. Identical or similar components may be indicated by identical or similar reference numerals in the attached drawings, and redundant descriptions regarding the identical or similar components may be omitted in the description of each of the embodiments. Further, features described in each of the embodiments are also applicable to other embodiments in so far as they do not contradict each other.

FIG. 1 schematically illustrates an AM apparatus for manufacturing a fabricated object according to one embodiment. As illustrated in FIG. 1, an AM apparatus 100 includes a process chamber 102. A buildup chamber 106 is attached to a bottom surface 104 of the process chamber 102. A lift table 108 is installed in the buildup chamber 106. The lift table 108 is movable in the vertical direction (a z direction) by a driving mechanism 110. The driving mechanism 110 may be, for example, a pneumatic or hydraulic driving mechanism or may be a driving mechanism including a motor and a ball screw. An inlet and an outlet for introducing and discharging protective gas into and out of the process chamber 102 may be provided, although they are not illustrated.

In one embodiment, an XY stage 112 is disposed on the lift table 108 as illustrated in FIG. 1. The XY stage 112 is a stage movable in two directions (an x direction and a y direction) in parallel with the plane of the lift table 108. A base plate 114 for supporting a material of a fabricated object is disposed on the XY stage 112.

A material supply mechanism 150 for supplying the material of the fabricated object is disposed above the buildup chamber 106 in the process chamber 102. The material supply mechanism 150 includes a storage container 154 for holding powder 152 used as the material of the fabricated object, such as metal powder, and a movement mechanism 160 for moving the storage container 154. The storage container 154 includes an opening 156 for discharging the material powder 152 onto the base plate 114. The opening 156 can be, for example, a linear opening 156 longer than one side of the base plate 114. In this case, the material powder 152 can be supplied to the entire surface of the base plate 114 by configuring the movement mechanism 160 so as to move in a range longer than the other side of the base plate 114 in a direction perpendicular to the line of the opening 156. Further, the storage container 154 includes a valve 158 for controlling the opening/closing of the opening 156.

Only one storage container 154 is disposed in FIG. 1, but a plurality of storage containers 154 may be disposed as one embodiment. In the case where the plurality of storage containers 154 is disposed, each of the storage containers 154 may be used to hold a different material or may be used to hold the material powder 152 that is the same material but has a different particle diameter.

In one embodiment, the AM apparatus 100 includes a laser light source 170, and a scanning mechanism 174, which guides a laser 172 emitted from the laser light source 170 toward the material powder 152 on the base plate 114, as illustrated in FIG. 1. Further, the AM apparatus 100 illustrated in FIG. 1 includes an adjustment device 171 for adjusting the intensity of the beam to be applied. This adjustment device 171 can be configured to adjust the power of electricity to be supplied to the laser light source or the electron beam source. Further, the AM apparatus 100 illustrated in FIG. 1 includes a beam shaper 173 for adjusting the shape and the profile of the beam to be applied. In the illustrated embodiment, the laser light source 170, the adjustment device 171, the beam shaper 173, and the scanning mechanism 174 are disposed in the process chamber 102, but all or a part of them may be disposed outside the process chamber 102. The scanning mechanism 174 can be formed by an arbitrary optical system, and is configured to be able to irradiate an arbitrary position of a fabrication plane (a focus plane) on the base plate 114 with the laser 172.

In one embodiment, the AM apparatus 100 includes a temperature detector 175 for measuring the temperature of the irradiation position of the beam. The temperature sensor 175 can be any non-contact type temperature sensor, and may be realized by, for example, employing a method that irradiates a weld pool while superimposing a laser for the measurement on the optical axis of a laser for melting the metal with use of a monochromatic radiation thermometer that works with a measurement wavelength of approximately 650 nm, and receives reflected light on a detection element such as silicon. The laser for the measurement uses a wavelength different from the wavelength of the laser for the melting. Temperature data measured by the temperatures sensor 175 is transmitted to a control device 200. In one embodiment, the control device 200 may control the output of the beam based on the temperature of the beam irradiation position measured by the measurement sensor 175. Mild melting that will be described below can be realized by, for example, controlling the irradiation energy of the beam in such a manner that the temperature of the beam irradiation position falls within a range of the melting point of the material +2% to 10%.

In one embodiment, an electron beam source may be used instead of the laser light source 170. In the case where the electron beam source is used, the scanning mechanism 174 includes a magnet or the like, and is configured to be able to irradiate an arbitrary position of the fabrication plane on the base plate 114 with an electron beam.

In the embodiment illustrated in FIG. 1, the AM apparatus 100 includes the control device 200. The control device 200 is configured to control the operations of various kinds of operation mechanisms of the AM apparatus 100, such as the above-described driving mechanism 110, movement mechanism 160, laser light source 170, adjustment device 171, beam shaper 173, scanning mechanism 174, and valve 158 of the opening 156. The control device 200 can be formed by a general computer or a dedicated computer.

In one embodiment, the AM apparatus 100 includes a fabrication recipe determination device 202. The fabrication recipe determination device 202 may be formed by the same hardware as the control device 200 or may be formed by dedicated hardware different from the control device 200. The fabrication recipe determination device 202 is configured to determine a recipe of the AM process based on the properties of the material powder 152 to be used for the fabrication. The properties of the material powder 152 include, for example, the material and the particle diameter of the powder. The recipe determined by the fabrication recipe determination device 202 includes at least one of energy, power, a power density, a spot size, an irradiation time, and a scanning speed of the beam to be applied.

In one embodiment, the AM apparatus 100 can include a classifier 250 for classifying the material powder 152 based on the particle size. Desirably, the classifier 250 can classify the material powder 152 into a plurality of classes ranging over a narrow distribution of particle diameters. In one embodiment, it is effective to classify the material powder 152 in such a manner that the standard deviation is approximately 5% of the central particle diameter.

When a three-dimensional object is fabricated by the AM apparatus 100 according to the embodiment illustrated in FIG. 1, the procedure therefor is generally as follows. First, three-dimensional data D1 of a fabrication target is input to the control device 200. The control device 200 generates slice data for the fabrication based on the input three-dimensional data D1 of the fabricated object. Further, the fabrication recipe determination device 202 or the control device 200 including the fabrication recipe determination device 202 generates execution data including fabrication conditions and the recipe. The fabrication conditions and the recipe include, for example, beam conditions, beam scanning conditions, and layering conditions. The beam conditions include voltage conditions, a laser output, and the like of the laser light source 170 in the case where the laser is used, or include a beam voltage, a beam current, and the like in the case where the electron beam is used. The beam scanning conditions include a scanning pattern, a scanning route, a scanning speed, a scanning interval, and the like. Examples of the scanning pattern include a pattern when the beam scans in one direction, a pattern when the beam scans in reciprocating directions, a pattern when the beam scans zigzag, and a pattern when the beam moves transversely while drawing a small circle. The scanning route determines, for example, in what order the beam scans. The layering conditions include, for example, a material type, an average particle diameter of the powder material, a particle shape, a particle size distribution, a layering thickness (a thickness in which the material powder is deposited all over the surface at the time of the fabrication), and a fabrication thickness coefficient (a ratio between the layering thickness and the thickness of the actually manufactured fabricated object). A part of the above-described fabrication conditions and recipe may be generated and changed according to the input three-dimensional data of the fabricated object or may be determined in advance independently of the input three-dimensional data of the fabricated object.

The material powder 152 of the fabricated object, such as metal powder, is loaded into the storage container 154. The lift table 108 of the buildup chamber 106 is moved to an upper position, by which the surface of the base plate 114 is adjusted so as to be positioned on the focus plane of the laser 172. Next, the valve 158 of the opening 156 of the storage container 154 is opened and the storage container 154 is moved, and then the material powder 152 is evenly supplied onto the base plate 114. The material supply mechanism 150 is controlled by the control device 200 so as to supply the material powder 152 onto the focus plane by an amount corresponding to one layer of the fabricated object (corresponding to the above-described "layering thickness"). Next, a fabricated object M1 corresponding to one layer is created by emitting the laser 172 from the laser light source 170, irradiating a predetermined range of the focus plane with the laser 172 by the scanning mechanism 174, and melting and sintering the material powder at a predetermined position. At this time, the irradiation position of the laser 172 may be changed by also moving the XY stage 112 disposed on the lift table 108 if necessary.

After the fabrication corresponding to one layer is ended, the lift table 108 of the buildup chamber 106 is lowered by a distance corresponding to one layer. The material powder 152 is supplied onto the focus plane by the material supply mechanism 150 by an amount corresponding to one layer of the fabricated object again. Then, the fabricated object M1 corresponding to one layer is created by causing the laser 172 to scan on the focus plane by the scanning mechanism 174 and melting and sintering the material powder 152 at a predetermined position. The targeted fabricated object M1 can be entirely created from the powder 152 by repeating these operations.

In the following description, the determination about the fabrication conditions and the recipe by the AM apparatus according to one embodiment will be described in detail. As described above, it is desirable to reduce the fabrication time while preventing or reducing the occurrence of fume and spatter in the AM apparatus. Therefore, in the following description, a measure for reducing the fabrication time while preventing or reducing the occurrence of fume and spatter will be described. This measure will be described assuming that stainless steel (SUS) is used as the material powder 152 as one example.

Figure 2:
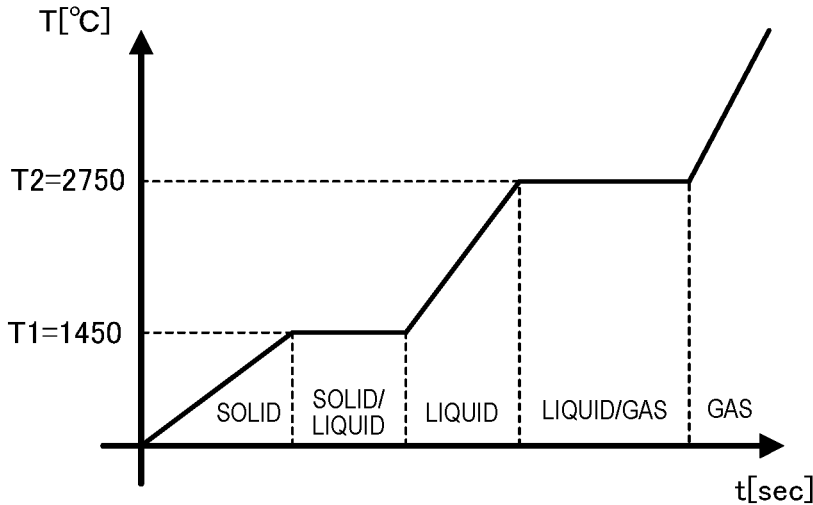
FIG. 2 schematically illustrates a temperature and a state change when SUS is heated.

FIG. 2 schematically illustrates a temperature and a state change when SUS is heated. As illustrated in FIG. 2, when being heated, SUS reaches a melting point (T1) and transitions to a state in which a solid and liquid are mixed together. When being further continuously heated, SUS transitions to a state in which SUS is entirely liquefied. When being further heated, SUS reaches a boiling point (T2) and transitions to a state in which liquid and gas are mixed together, and transitions to a state in which SUS is entirely gasified by being further heated. FIG. 2 illustrates SUS having a melting point (T1) of 1450° C. and a boiling point (T2) of 2750° C. as one example, but it should be noted that a physical property such as the boiling point and the melting point varies depending on a difference in the composition even among SUS materials. Since a desired object is being fabricated by melting and solidifying the material powder in the AM technique, the material powder should be heated to the melting point or higher.

Figure 3:
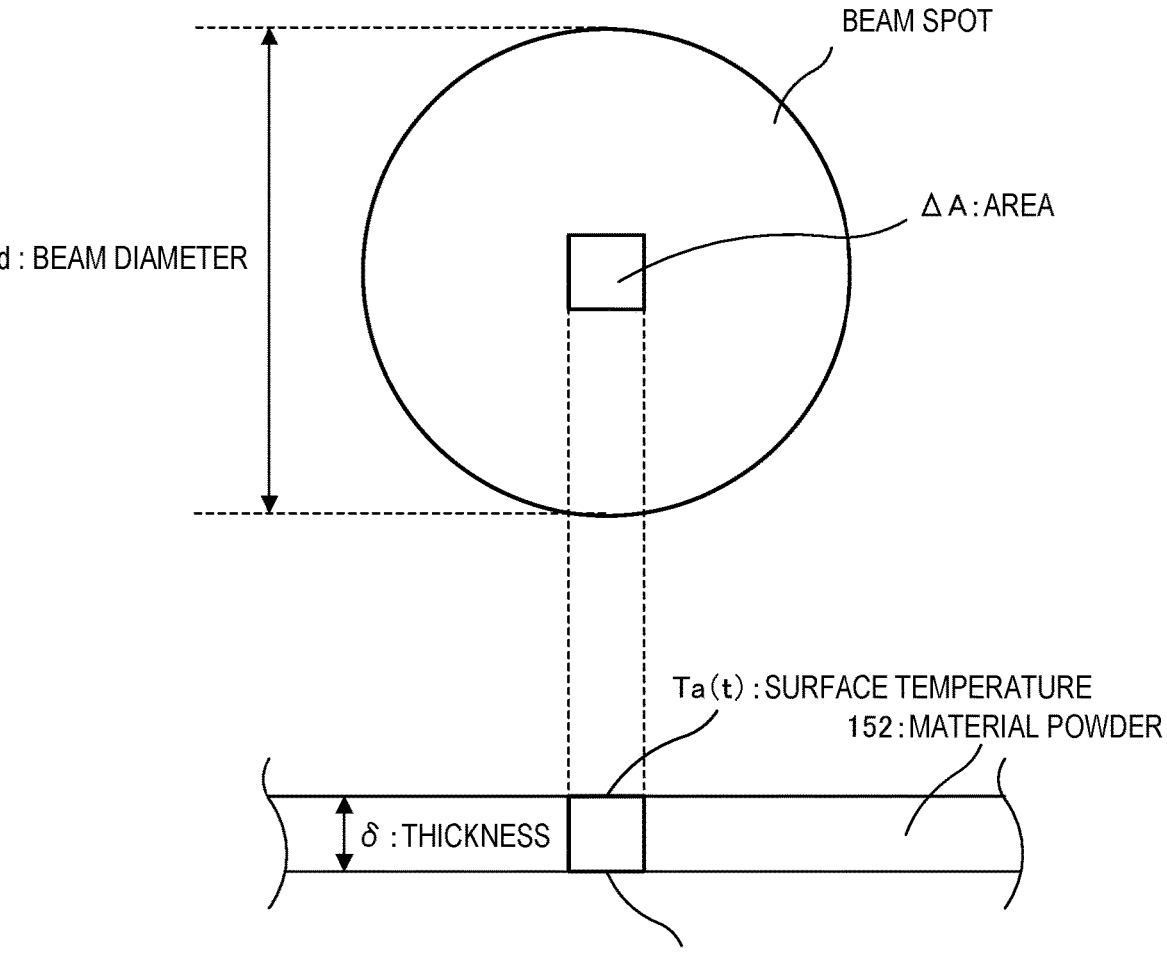
FIG. 3 illustrates a temperature increase when heat is being transmitted from the surface of material powder downward when the surface of the material is irradiated with a beam.

FIG. 3 illustrates a temperature increase when heat is being transmitted from the surface of the material downward when the surface of the material is irradiated with the beam. FIG. 3 illustrates the material powder 152 irradiated with the beam in a state viewed from above and a state viewed from the side. As illustrated in FIG. 3, assume that the material powder 152 is irradiated with a beam having a diameter d. FIG. 3 illustrates thermal conduction and a temperature increase in a region having an area $\Delta A$ and a thickness $\delta$ in the beam spot having the diameter d, and they will be described now.

A temperature ($Ta(0)$) of the surface of the material 152 before the beam irradiation is the same as a temperature ($Tb(0)$) of the lower surface of the material. This means $Ta(0)=Tb(0)$. A temperature $Tb(t)$ of the lower surface of the material when an arbitrary time t has elapsed since the irradiation with the beam is expressed as follows.

$$Tb(t)=(Ta(t)-Ta(0))\times(1-\exp(-t/\tau c))+Tb(0) \qquad \text{Equation (1):}$$

In this equation, $\tau c$ represents a time constant, and is expressed as follows.

$$\tau c=(m\times c)\times R \qquad \text{Equation (2):}$$

In this equation, each variable represents the following item.

m: mass [kg]$=\Delta A\times\delta\times\rho$ $\rho$: density [kg/m$^3$]

c: specific heat [J/kg·K]

m$\times$c: thermal capacity [J/K]

R: thermal resistance [K/W]

Further, the thermal resistance R is expressed as follows.

$$R=(\delta/(\lambda\times\Delta A)) \qquad \text{Equation (3):}$$

In this equation, $\lambda$ represents the following item.

$\lambda$: thermal conductivity [W/m·K]

Further, the time constant $\tau c$ can be expressed as follows based on the equation (2) and the equation (3).

$$\tau c=(\Delta A\times\delta\times\rho\times c)\times(\delta/(\lambda\times\Delta A))=\rho\times c\times\delta^2/\lambda \qquad \text{Equation (4):}$$

Figure 4:
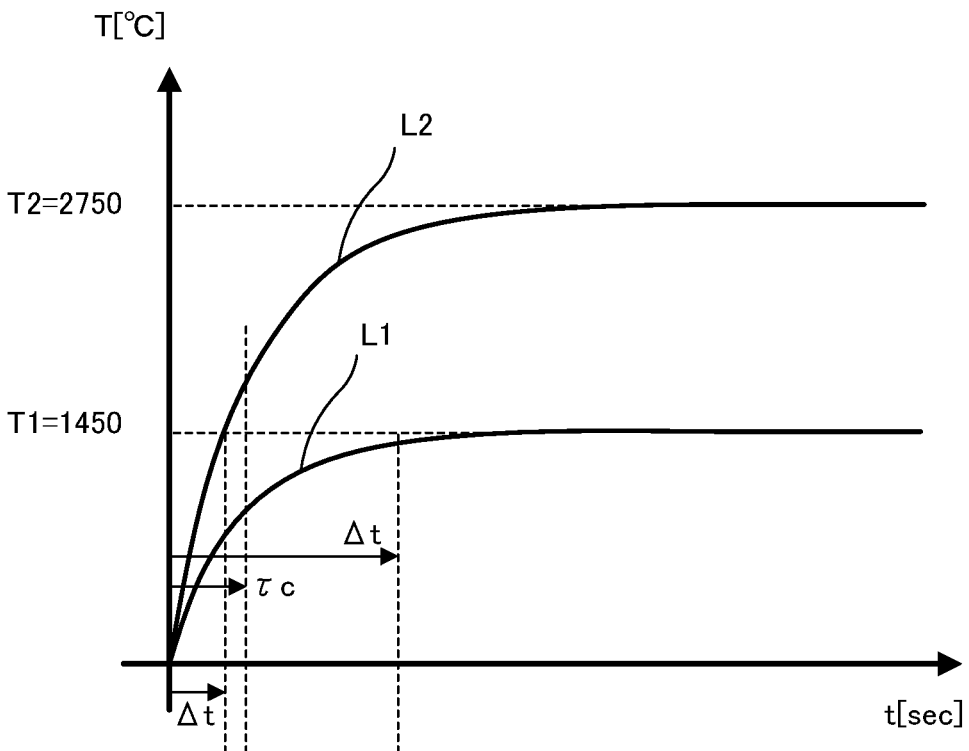
FIG. 4 is a graph schematically indicating an increase in the temperature of a lower surface when the surface of SUS used as the material is heated.

FIG. 4 is a graph schematically indicating the increase in the temperature of the lower surface Tb when the surface Ta of SUS used as the material is heated. A curve L1 in FIG. 4 indicates a change in the temperature of the lower surface of the material when the material is irradiated with the beam under a condition that causes the temperature of the surface of the material to reach approximately the melting point (T1=1450° C.) due to the irradiation with the beam (the mild condition). That is, this condition corresponds to Ta(t) =1450° C. On the other hand, a curve L2 in FIG. 4 indicates a change in the temperature of the lower surface of the material when the material is irradiated with the beam under a condition that causes the temperature of the surface of the material to reach approximately the boiling point (T2=2750° C.) due to the irradiation with the beam (a strict condition). That is, this condition corresponds to Ta(t)=2750° C. Because the time constant $\tau c$ is a condition determined based on the physical properties and the arrangement (the thickness $\delta$) of the material, the lower surface of the material reaches the melting point (T1) in a shorter time $\Delta t$ when the material is irradiated with the beam under the strict condition as seen from the equation (1) and the graph illustrated in FIG. 4. In other words, as the beam output increases, the lower surface of the material reaches the melting point (T1) in a shorter time Δt. Therefore, one conceivable measure for reducing the fabrication time in the AM technique is to increase the output of the beam and increase the scanning speed of the beam. However, as described above, increasing the irradiation energy of the beam causes an excessive increase in the temperature of the surface of the material powder layer to thus facilitate the occurrence of fume and spatter, and therefore may lead to, for example, a defect in the fabricated object and/or a failure in the beam irradiation system of the AM apparatus. Therefore, the present application is directed to contriving a method for reducing the fabrication time under the mild condition.

In the case of the beam irradiation under the mild condition, it is presumed that the surface temperature Ta(t) of the material reaches the melting point (T1=1450° C.) at some moment, and the surface temperature Ta(t)=T1 (=1450° C.) is maintained for some time Δt during the irradiation with the beam. In the case of the mild condition based on such a presumption, the time Δt required for the temperature Tb(t) of the lower surface at the depth δ from the surface of the material to reach the melting point (T1=1450° C.) is calculated as follows.

$$\Delta t \approx 4 \times \tau c = 4 \times \rho \times c \times \delta^2 / \lambda \qquad \text{Equation (5):}$$

In the equation (5), Δt is set to a time taken until Tb(t) reaches approximately 98% of a temperature corresponding to the increase in the temperature of the surface (Ta(t)−Ta (0)) in the equation (1). More precisely, the time for which the surface temperature Ta(t) can be kept at T1 (=1450° C.) is a time determined based on absorption of latent heat required for the material to transform from a solid to liquid and a diffused heat amount due to thermal conduction during that, and the surface temperature Ta(t) starts to rise after that. As a result, the temperature Tb(t) of the lower surface also rises and can reach the melting point or higher. Further, the mild melting intended by the present application can also be realized by a method that monitors the surface temperature Ta(t) and controls the irradiation energy of the beam in such a manner that the surface temperature Ta(t) falls within a range of the melting point of the material +2% to 10%. This method places emphasis on being able to make a parameter comparison (a qualitative comparison) and being also able to make a relative quantitative comparison with respect to the relationship among the density, the specific heat, the thermal conductivity, the thickness, and the required time Δt for each material with use of the equation (5). In one embodiment, the intensity of the beam and the beam size on the material may be determined in such a manner that the temperature of the lower surface of the material reaches the melting point with the irradiation time of the beam lasting for approximately 2τc to approximately 4τc to realize the fabrication under the mild condition. Alternatively, the intensity of the beam and the beam size on the material may be determined so as to realize the fabrication under the mild condition with the irradiation time of the beam lasting for approximately 3τc to approximately 4τc.

As seen from the equation (4) and the equation (5), τc is proportional to a square of the thickness δ of the material, and therefore reducing the thickness δ of the material leads to a reduction in the time constant τc, thereby also leading to a reduction in Δt as a result thereof. In other words, it is desirable to reduce the thickness δ of the material to reduce the fabrication time in the AM technique using the powder material. As one example, assuming that SUS is used as the material powder and the thickness δ of the material is δ=0.05 mm, the time constant τc is calculated to be τc=7900×590×

$0.05^2 \times 10^{-6}/17 \approx 0.685$ [ms], when the following substitutions are added to the equation (4).
$\rho$=7900 [kg/m$^3$]
$c$=590 [J/kg·K]
$\delta$=0.05×10$^{-3}$ [m]
$\lambda$=17 [W/m·K]

Further, the time Δt is calculated to be Δt≈4×τc=2.74 [ms] from the equation (5).

When the material powder is used, an interface is present between a particle and a particle in the powder, and therefore contact resistance is present between the particle and the particle. Then, assuming that the contact resistance is expressed as the contact resistance≈δg/λg, the above-described thermal resistance R can be expressed as follows.

$$R=\{(\delta/k)+(\delta g/\lambda g)\}\times(1/\Delta A)=R\#\times(1/\Delta A) \qquad \text{Equation (6):}$$

Now, R# is expressed as follows.

$$R\#=(\delta \times \lambda g+\delta g \times \lambda)/(\lambda \times \lambda g) \qquad \text{Equation (7):}$$

Because the thermal resistance R is expressed as (thickness/thermal conductivity)×(1/ΔA) as indicated by the equation (3), similarly, (δ×λg+δg×λ) and (λ×λg) in R# in the equation (7) can be deemed to be an "equivalent thickness" and an "equivalent thermal conductivity", respectively.

Figure 5:
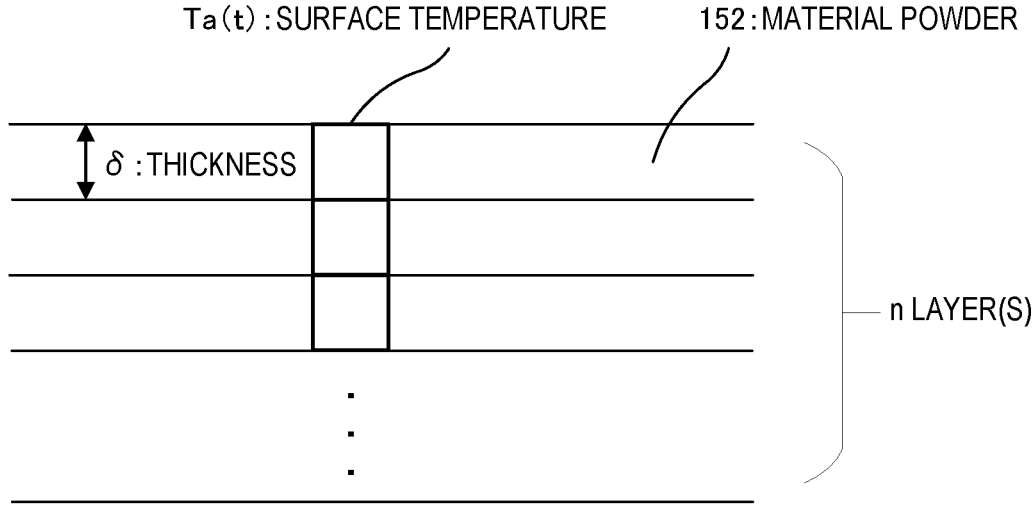
FIG. 5 schematically illustrates how the material powder is layered in n layers.

FIG. 5 schematically illustrates how the material powder is layered in n layers of particles. Assuming that δ, λ, δg, and δg in each of the layers are the same, R# throughout all the n layers is expressed as follows.

$$R\#=(\delta \times g+\delta g \times \lambda) \times n/(\lambda \times \lambda g) \qquad \text{Equation (8):}$$

When the above-described Δt is calculated assuming that Δ represents the equivalent thickness (δ×λg+δg×λ), Δt is calculated as follows.

$$\Delta t \approx 4\tau c=4 \times \rho \times c \times \delta \times n \times (\Delta \times n)/(\lambda \times \lambda g)=4 \times \rho \times c \times \delta \times n^2/(\lambda \times \lambda g) \qquad \text{Equation (9):}$$

As seen from the equation (9), τc and Δt are proportional to a square of n, which is the number of layers of powder particles, and therefore reducing the number n of layers leads to a reduction in the time constant τc, thereby also leading to a reduction in Δt as a result thereof. It is desirable to reduce the number n of layers of particles of the material powder to reduce the fabrication time in the AM technique using the powder material.

From the above-described analysis, it is desirable to reduce the thickness in which the material powder is layered to reduce the fabrication time while preventing or reducing the occurrence of fume and spatter in the AM technique using the material powder. Further, desirably, the number n of layers of powder particles to be layered is 1. Further, reducing the number n of layers of powder particles to be layered establishes such a state that an already fabricated lower layer can be observed via a gap between the powder particles when being viewed from the irradiation side. Therefore, it is considered that this reduction allows the AM apparatus 100 to directly irradiate the material powder to be melted and the material surface of the already fabricated lower layer with the beam, thereby being able to reduce the fabrication time.

Further, if the material powder has a wide distribution of particle diameters, the fabrication time increases because the scanning speed of the beam should be determined in correspondence with a large particle diameter. Therefore, a narrow distribution is desirable as the distribution of particle diameters of the material powder. In one embodiment, it is effective to classify the material powder 152 in such a manner that the standard deviation is approximately 5% of the central particle diameter. In one embodiment, the AM apparatus illustrated in FIG. 1 can include the classifier 250. A powder material having a narrow distribution of particle diameters can be prepared by using the classifier 250. Further, material powder classified into a plurality of classes corresponding to different central particle diameters can be prepared. The fabrication can be conducted at an optimum scanning speed according to the central particle diameter by using different scanning speeds of the beam for the powder materials corresponding to the different central particle diameters. The material powder corresponding to the different central particle diameters can be held in the above-described respective storage containers 154.

Further, it is desirable to set the scanning speed F of the beam as follows in consideration of the time taken until the heat is transmitted as far as the lower surface of the material powder, assuming that d represents the dimension of the beam spot in the beam scanning direction.

$$F \leq d / \Delta t \qquad \text{Equation (10):}$$

To further reduce the fabrication time, the scanning speed F of the beam can be increased by shaping the beam in such a manner that the beam spot has an elliptic shape and the major axis direction thereof extends in the scanning direction. Further, it is more desirable to shape the beam in such a manner that the beam profile has a top-hat shape than a Gaussian shape. Shaping the beam into the top-hat shape allows the beam to yield further average melting. The shape of the beam can be adjusted by the above-described beam shaper 173.

As described above, the AM apparatus 100 illustrated in FIG. 1 includes the fabrication recipe determination device 202. In one embodiment, the fabrication recipe determination device 202 has the following functions. The fabrication recipe determination device 202 holds the following data as setting values.

a standard beam diameter or a length in the scanning direction: d0
a standard beam width (a width perpendicular to the scanning direction): w0
a standard beam output: P0

The fabrication recipe determination device 202 calculates the time constant τc based on the material and the particle diameter of the material powder 152, and the thickness in which the material powder 152 is deposited all over the surface.

The fabrication recipe determination device 202 calculates the time Δt required to melt the material powder 152 deposited all over the surface. The time Δt is calculated as follows.

$$\Delta t = a1 \times 4 \times \tau c \, [\text{sec}] \qquad \text{Equation (11):}$$

In this equation, a1 represents a correction coefficient, and is assumed to be, for example, 1.0.

A beam irradiation area S is calculated according to S=d×w based on the length d of the beam in the scanning direction and the width w of the beam perpendicular to the scanning direction. The fabrication recipe determination device 202 calculates minimum thermal energy Q required to heat the material powder 152 deposited all over the surface in the layered thickness δ to the melting temperature Δt with the beam irradiation area S=d×w. Q is calculated from the following equation.

$$Q = a2 \times S \times \delta \times \rho \times c \times \Delta T \, [J] \qquad \text{Equation (12):}$$

In this equation, a2 represents a correction coefficient, and is assumed to be, for example, 1.0.

The fabrication recipe determination device 202 calculates the beam scanning speed F according to F=d0/Δt as an initial calculated value.

Supposing that the AM apparatus 100 attempts to fabricate some region having a width ΔY and a depth ΔX within some time ta based on the three-dimensional data D1 input to the control device 200, the fabrication recipe determination device 202 operates in this case in the following manner.

The fabrication recipe determination device 202 calculates a time tcal taken for the fabrication of this region according to the following equation.

$$tcal = a3 \times (\Delta X / F) \times (\Delta Y / w0) \, [\text{sec}] \qquad \text{Equation (13):}$$

In this equation, a3 represents a correction coefficient, and is assumed to be, for example, 1.2. The correction coefficient a3 corresponds to an overlap in the direction of the width w when the beam scans.

If the time tcal is tcal≤ta, the fabrication recipe determination device 202 determines that the fabrication can be conducted with the standard beam dimensions (d0 and w0) and the beam scanning speed F kept at the initial calculated value.

On the other hand, if the time tcal is tcal>ta, the fabrication recipe determination device 202 determines the beam dimensions (d and w) that satisfy tcal≤ta by changing the length d of the beam in the scanning direction and/or the width w of the beam perpendicular to the scanning direction. For example, the width w is changed to reduce tcal while fixing the scanning speed F. On the other hand, the length d is changed to reduce tcal while increasing the scanning speed F.

For the correction coefficients a1, a2, and a3, optimum values may be determined from a simulation and/or an experiment.

The fabrication recipe determination device 202 determines the output P of the beam generation source in proportion to the beam area S, and determines the recipe so as to keep the energy density constant. Further, if the fabricated object has a fine shape, the fabrication recipe determination device 202 determines the recipe so as to conduct the fabrication while reducing the beam dimensions (d and w) and reducing the power P of the beam so as to keep the energy density constant.

Having described the embodiments of the present invention based on the several examples, the above-described embodiments of the invention are intended to only facilitate the understanding of the present invention, and are not intended to limit the present invention thereto. It is apparent that the present invention can be modified or improved without departing from the spirit thereof, and includes equivalents thereof. Further, each of the components described in the claims and the specification can be arbitrarily combined or omitted within a range that allows it to remain capable of achieving at least a part of the above-described objects or bringing about at least a part of the above-described advantageous effects.

At least the following technical ideas can be recognized from the above-described embodiments.

[Configuration 1] According to a configuration 1, an AM apparatus for manufacturing a fabricated object is provided. This AM apparatus includes a beam source configured to irradiate a material of the fabricated object with a beam, an adjustment device configured to adjust an intensity of the beam, a beam adjustment mechanism configured to adjust a beam size on the material, and a fabrication recipe determination device. The fabrication recipe determination device is configured to determine the intensity of the beam and the beam size on the material based on a property of the material of the fabricated object.

[Configuration 2] According to a configuration 2, in the AM apparatus according to the configuration 1, the property of the material of the fabricated object includes a density ($\rho$), specific heat (c), a thermal conductivity ($\lambda$), and a thickness ($\delta$).

[Configuration 3] According to a configuration 3, in the AM apparatus according to the configuration 1 or the configuration 2, the fabrication recipe determination device is configured to determine the intensity of the beam and the beam size on the material in such a manner that the material of the fabricated object reaches a melting temperature with an irradiation time of the beam lasting for approximately $2\tau c$ to approximately $4\tau c$, assuming that $\tau c$ represents a time constant of thermal conduction of the material of the fabricated object.

[Configuration 4] According to a configuration 4, in the AM apparatus according to any one of the configuration 1 to the configuration 3, the fabrication recipe determination device determines the intensity of the beam and the beam size on the material in such a manner that a surface of the material of the fabricated object has a temperature within a melting point +2% to 10%.

[Configuration 5] According to a configuration 5, in the AM apparatus according to any one of the configuration 1 to the configuration 4, the material of the fabricated object is powder. The AM apparatus further includes a classifier configured to classify the powder into a plurality of classes corresponding to different particle diameters.

[Configuration 6] According to a configuration 6, in the AM apparatus according to the configuration 5, the fabrication recipe determination device is configured to determine the intensity of the beam and the beam size on the material according to a particle diameter of the powder.

[Configuration 7] According to a configuration 7, a method for manufacturing a fabricated object by an AM technique is provided. This method includes a step of preparing a material of the fabricated object, a step of determining an intensity of a beam and a beam size on the material based on a property of the material of the fabricated object, and a step of irradiating a surface of the material with the beam according to the determined beam intensity and beam size.

[Configuration 8] According to a configuration 8 the property of the material of the fabricated object includes a density ($\rho$), specific heat (c), a thermal conductivity ($\lambda$), and a thickness ($\delta$).

[Configuration 9] According to a configuration 9, in the method according to the configuration 7 or the configuration 8, the intensity of the beam and the beam size on the material are determined in such a manner that the material of the fabricated object reaches a melting temperature with an irradiation time of the beam lasting for approximately $2\tau c$ to approximately $4\tau c$, assuming that $\tau c$ represents a time constant of thermal conduction of the material of the fabricated object.

[Configuration 10] According to a configuration 10, in the method according to any one of the configuration 7 to the configuration 9, the intensity of the beam and the beam size on the material are determined in such a manner that a surface of the material of the fabricated object has a temperature within a melting point +2% to 10%.

[Configuration 11] According to a configuration 11, in the method according to any one of the configuration 7 to the configuration 10, the material of the fabricated object is powder. The method further includes a step of classifying the powder into a plurality of classes corresponding to different particle diameters.

[Configuration 12] According to a configuration 12, in the method according to the configuration 11, the intensity of the beam and the beam size on the material are determined according to a particle diameter of the powder.

REFERENCE SIGNS LIST

102 process chamber
106 buildup chamber
108 lift table
110 driving mechanism
112 stage
114 base plate
150 material supply mechanism
152 material powder
154 storage container
160 movement mechanism
170 laser light source
171 adjustment device
172 laser
173 beam shaper
174 scanning mechanism
200 control device
202 fabrication recipe determination device
D1 three-dimensional data
M1 fabricated object

What is claimed is:

1. An AM apparatus for manufacturing a fabricated object, the AM apparatus comprising:

a beam source configured to irradiate a material of the fabricated object with a beam;

an adjustment device configured to adjust an intensity of the beam;

a beam adjustment mechanism configured to adjust a beam size on the material;

a fabrication recipe determination device, and a control device;

wherein the fabrication recipe determination device is configured to determine the intensity of the beam and the beam size on the material based on a property of the material of the fabricated object, wherein the fabrication recipe determination device is configured to determine the intensity of the beam and the beam size on the material in such a manner that the material of the fabricated object reaches a melting temperature with an irradiation time of the beam lasting for approximately $2\ \tau c$ to approximately $4\ \tau c$, wherein $\tau c$ represents a time constant of thermal conduction of the material of the fabricated object, a base plate for supporting a material of the fabricated object;

a material supply mechanism for supplying the material of the fabricated object on the base plate;

wherein the material of the fabricated object is powder comprising particles, and the control device is configured to control the material supply mechanism to supply only one layer of particles of the powder, wherein the material supply mechanism comprises a storage container and a movement mechanism for moving the storage container, the storage container comprising an opening for discharging the powder and a valve for controlling the opening/closing of the opening.

2. The AM apparatus according to claim 1, wherein the property of the material of the fabricated object includes a density ($\rho$), specific heat (c), a thermal conductivity ($\lambda$), and a thickness ($\delta$).

3. The AM apparatus according to claim 1, wherein the fabrication recipe determination device determines the intensity of the beam and the beam size on the material in such a manner that a surface of the material of the fabricated object has a temperature within a melting point+2% to 10%.

4. The AM apparatus according to claim 1, wherein the material of the fabricated object is powder, and wherein the AM apparatus further includes a classifier configured to classify the powder into a plurality of classes corresponding to different particle diameters.

5. An AM apparatus for manufacturing a fabricated object, the AM apparatus comprising:

a beam source configured to irradiate a material of the fabricated object with a beam;

an adjustment device configured to adjust an intensity of the beam;

a beam adjustment mechanism configured to adjust a beam size on the material; and a fabrication recipe determination device, wherein the fabrication recipe determination device is configured to determine the intensity of the beam and the beam size on the material based on a property of the material of the fabricated object, wherein the fabrication recipe determination device is configured to determine the intensity of the beam and the beam size on the material in such a manner that the material of the fabricated object reaches a melting temperature with an irradiation time of the beam lasting for approximately 2 $\tau c$ to approximately 4 $\tau c$, wherein $\tau c$ represents a time constant of thermal conduction of the material of the fabricated object, wherein the material of the fabricated object is powder, and wherein the AM apparatus further includes a classifier configured to classify the powder into a plurality of classes corresponding to different particle diameters, wherein the fabrication recipe determination device is configured to determine the intensity of the beam and the beam size on the material according to a particle diameter of the powder, wherein $\tau c = (\Delta A \times \delta \times \rho \times c) \times (\delta / (\lambda \times \Delta A)) = \rho \times c \times \delta[2]^2 / \lambda$ $\Delta A$: area of region of interest $\delta$: thickness of the material $\rho$: density of the material c: specific heat of the material $\lambda$: thermal conductivity of the material.

* * * * *